United States Patent [19]
Prince et al.

[11] 3,979,792
[45] Sept. 14, 1976

[54] ANIMAL HOLD DOWN/NECK STRETCHER FOR KOSHER SLAUGHTER ON A DOUBLE-RAIL ANIMAL SUPPORT SYSTEM

[75] Inventors: Ralph P. Prince, Storrs; Paul E. Belanger, Mansfield Center; Walter Giger, Jr., Wethersfield; David H. Johnson, Storrs, all of Conn.

[73] Assignee: Council of Livestock Protection, Inc., New York, N.Y.

[22] Filed: Oct. 1, 1975

[21] Appl. No.: 618,466

[52] U.S. Cl. .................................... 17/1 A; 119/96
[51] Int. Cl.² ........................................ A22B 3/12
[58] Field of Search ............... 17/1 A, 1 R, 24, 44; 119/96, 158

[56] References Cited
UNITED STATES PATENTS
3,292,206  12/1966  Aubert ............................. 17/1 A

*Primary Examiner*—Hugh R. Chamblee
*Attorney, Agent, or Firm*—Moonray Kojima

[57] ABSTRACT

This is an improvement of the neck stretching and body restraining frame disclosed in Giger, Westervelt patent application Ser. No. 618,463, filed concurrently herewith. The jaw holder is eliminated and a shoulder brace is provided under the neck restraining extension. The shoulder brace is constructed of two triangular pieces with ends connected to the inner and outer bars of the body frame and suitably constructed to firmly hold the animal to be slaughtered.

1 Claim, 3 Drawing Figures

ANIMAL HOLD DOWN/NECK STRETCHER FOR KOSHER SLAUGHTER ON A DOUBLE-RAIL ANIMAL SUPPORT SYSTEM

This invention relates to an improved neck stretching and body restraining frame used for slaughtering animals.

In copending patent application Giger, Westervelt Ser. No. 618,463 filed concurrently herewith and assigned to the same assignee hereof, there is disclosed a neck stretching and body restraining frame comprising a body frame having inner bars and outer bars held by semicircular cross bars and extending at an angle therefrom a neck restrainer and jaw holder to hold the animal's neck stretched and stable. The specification of such application is hereby incorporated herein by reference.

The present invention eliminates the jaw holder and provides a shoulder brace comprising a pair of triangular shaped pieces held by the inner and outer bars of the body frame. The shoulder brace is located toward the front of the body frame and below the extended neck restrainer and is suitably constructed to securely hold the shoulder of the animal.

The invention will be further illustrated with reference to the drawings, in which.

Figure 1:
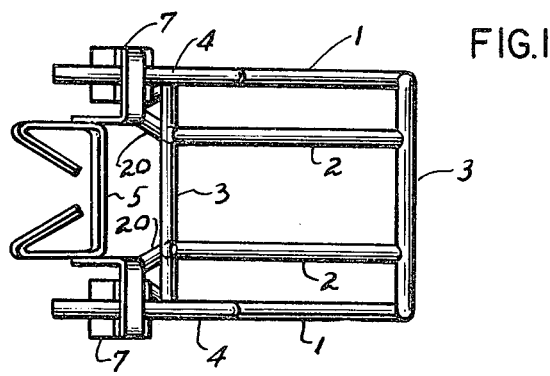
FIG. 1 depicts a top view of an illustrative embodiment of the invention.
Figure 2:
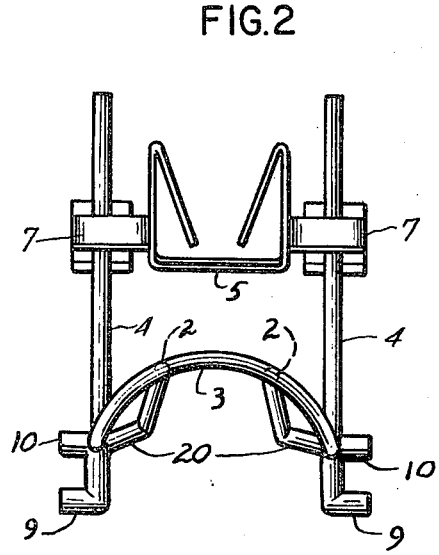
FIG. 2 depicts an end view of the embodiment.
Figure 3:
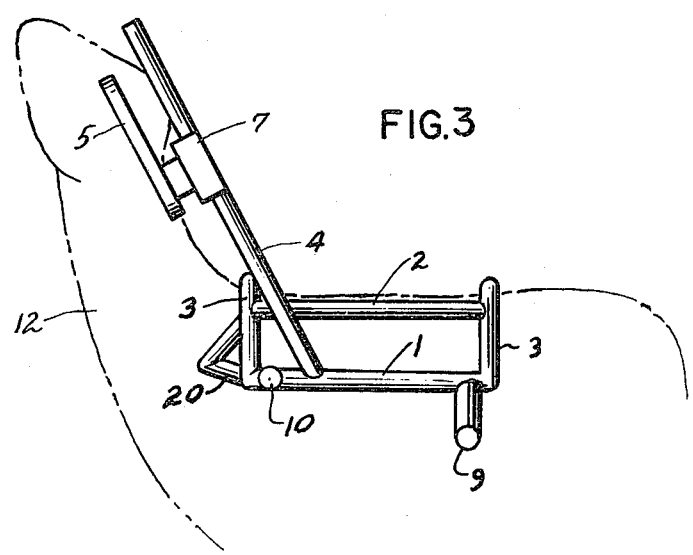
FIG. 3 depicts a side view of the embodiment as placed on an animal.

Turning now to FIGS. 1, 2 and 3, the body frame part comprises parallel outer bars 1, parallel inner bars 2 interconnected by semi-circular shaped cross bars 2. Connected to both outer bars 1 are extensions 9 and 10, which may engage slots on the stationary side walls between which the conveyor on which the animal is carried, is located. By suitable placement of the slots or guides, the frame and animal body may be manuevered as desired. Connected to frame bar 1 and extended therefrom at an angle alpha, which may be for some applications 63°, are two holder bars 4 to which neck restraining means 5 may be attached by connectors 7. The restrainer may be of a steel strip shaped as depicted and having resilient bent portion for securely holding the upper neck of the animal as depicted. Whereas in the mentioned Giger, Westervelt application, there is a semicircular jaw holder attached to the end of holder bar 4, the present invention eliminates such jaw holder.

In this invention, there is added a shoulder brace 20 as depicted. As can be seen, the triangular (from the side view) shaped braces 20 will fit suitably over the shoulder of the animal and it was discovered, be sufficient to keep the neck stretched. The flat spring 5 secures the head beneath the ears and adjusts to the size of the head of the animal. The upright 7 also enables the strip 5 to adjust to the different neck length. The shoulder brace 20 also prevents any friction from developing between the frame and side walls by preventing the animal from slipping through the back frame.

The placement of the frame on the animal and use of the frame during the conveying operation is similar to the operation of the above mentioned Giger, Westervelt disclosure and hence need not be further discussed hereat. Such disclosure is incorporated herein by reference.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. In a neck stretching and body restraining frame for slaughtering animals, comprising a pair of parallel inner bars, a pair of parallel outer bars; circularly shaped cross bars interconnecting said inner and outer bars; a pair of parallel holder bars extending at an angle from one end of said interconnected outer bars; a neck restraining means comprising flexible double strips connected between said parallel holder bars to hold the neck of said animal; and outwardly extending bearings attached to said outer bars for movably holding said frame on the back of said animal during the slaughter operation; the improvement comprising a pair of shoulder braces comprising a triangular shaped bars having one end connected to the inner bar and the other end connected to the outer bar with the triangular shaped part extending outwardly from said frame toward the end where said neck restraining means is located.

* * * * *